June 24, 1930.   G. SCHWAEBEL ET AL   1,766,404
PROCESS FOR THE CONCENTRATION OF ACETIC ACID
Filed May 10, 1927
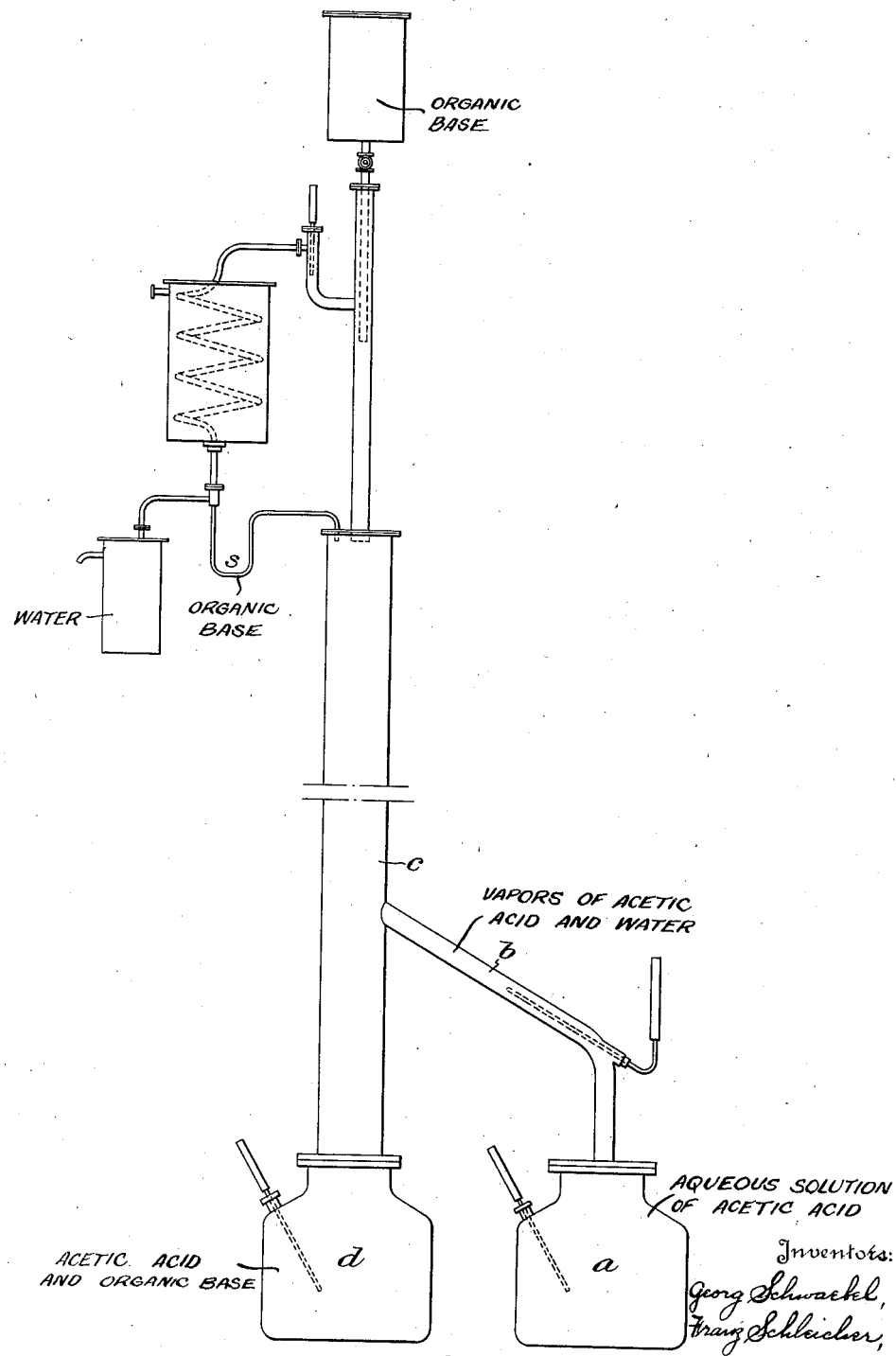

Patented June 24, 1930

1,766,404

UNITED STATES PATENT OFFICE

GEORG SCHWAEBEL, OF LEVERKUSEN-ON-THE-RHINE, AND FRANZ SCHLEICHER, OF WIESDORF-ON-THE-RHINE, GERMANY, ASSIGNORS TO I. G. FARBENINDUSTRIE AKTIENGESELLSCHAFT, OF FRANKFORT-ON-THE-MAIN, GERMANY

PROCESS FOR THE CONCENTRATION OF ACETIC ACID

Application filed May 10, 1927, Serial No. 190,356, and in Germany May 12, 1926.

The present invention resides in a process for the concentration of aqueous solutions of acetic acid, said process involving extracting dilute aqueous solutions of acetic acid with organic bases or mixtures thereof which are not acetylated by or do not form stable compounds by chemical reaction with acetic acid and which preferably are substantially insoluble in or immiscible with water. In accordance with the invention the extraction of the dilute aqueous solutions of acetic acid with the organic bases advantageously may be carried out in the presence of organic solvents for the organic bases and the acetic acid which are substantially insoluble in water or in the presence of water-soluble salts which serve to reduce the solubility of water in the organic bases.

As organic bases suitable for use in the process may be mentioned quinoline, quinaldine, dimethylaniline, diethylaniline, and the like.

The essential distinction and technical advancement offered by our new process over the use of solvents hitherto recommended for the extraction of acetic acid, as for example, toluene, ether, chloroform and the like lies in the fact, that the organic bases possess a chemical affinity towards acetic acid which said solvents do not possess and accordingly a much greater capacity for the extraction of the acetic acid.

The extracted acetic acid can be easily distilled out of its solution in the organic base which is recovered unchanged and therefore may be reused.

In carrying out our process an apparatus comprising a column is advantageously used, in which quinoline, for example, is brought into counter-current contact in the well-known manner with acetic acid vapors produced, for example, by boiling a 30 per cent aqueous solution of acetic acid.

Thus an aqueous distillate containing only a fraction of one per cent of the total acetic acid content of the acetic acid solution used and, depending on the conditions of working, a solution of 85 to 90 per cent of acetic acid in quinoline are produced. From this quinoline solution the acetic acid can be quite conveniently distilled off.

In the case where the base employed, for example quinoline, is volatile in steam it must naturally be recovered from the aqueous distillate. A mixture of organic bases can also be used.

The following is a description of one procedure in accordance with the invention associated with a description of apparatus suitable for carrying out said procedure illustrated in the accompanying drawing in which the figure is a vertical elevation of the apparatus.

In the vessel $a$ which is resistant to acetic acid the aqueous solution of acetic acid is heated to boiling. The vapors pass by way of the tube $b$ to the column $c$ which is also resistant to acetic acid and is charged with filling materials or fitted with perforated shelves. In this column the vapors come into contact with the descending organic base which dissolves out the acetic acid and carries the same into the vessel $d$ while the aqueous vapors leave the column at the top and are condensed in the customary manner. Any of the organic base which is carried away by the water vapor separates in the siphon $s$ and is returned to the column.

On account of the extraordinary solution affinity of certain organic bases for acetic acid the extraction of the acetic acid from its aqueous solutions may be carried out in the cold, that is to say without evaporation of the dilute solution of acetic acid, as described above. It has been found however that considerable quantities of water are dissolved by the organic base along with the acetic acid which can only partially be prevented by the addition of water-soluble salts to the mixture.

A considerable improvement can be achieved in this respect by the addition to the organic base or to the mixture of bases of water insoluble solvents which are substantially insoluble in water such as benzene, chloroform, trichlorethylene, ethylene chloride, carbon tetrachloride and the like, in consequence of which the amount of water dissolved by the organic base with the acetic acid is materially reduced.

In the following illustrative examples an aqueous solution of acetic acid of about 30 per cent concentration is employed which is once extracted in each case with an equal volume of quinoline.

| Addition | Proportion of acetic acid to water in the extract ||
|---|---|---|
| | Acetic acid | Water |
| | Per cent | Per cent |
| 1. None | 41 | 59 |
| 2. 10% of common salt | 56 | 44 |
| 3. 20% of common salt | 70 | 30 |
| 4. 1 volume of trichlorethylene | 80 | 20 |

The proportion of organic base to water insoluble solvent can obviously vary within wide limits.

The addition of benzene, chloroform and the like has the further advantage that it renders possible a particularly smooth removal of the water in the distillation of the extract, under either ordinary or reduced pressure, since the acetic acid is retained to a certain extent by the organic base while the water distills as a rule with the solvents mentioned at a lower temperature.

We claim:—

1. Process for the concentration of acetic acid which comprises extracting a dilute aqueous solution of acetic acid by means of an organic base which does not form a stable compound by chemical reaction with acetic acid.

2. Process for the concentration of acetic acid which comprises extracting a dilute aqueous solution of acetic acid by means of an aromatic amine which does not form a stable compound by chemical reaction with acetic acid.

3. Process for the concentration of acetic acid which comprises extracting a dilute aqueous solution of acetic acid by means of an organic base which does not form a stable compound by chemical reaction with acetic acid in the presence of a solvent for the organic base and the acetic acid which is substantially insoluble in water.

4. Process for the concentration of acetic acid which comprises extracting a dilute aqueous solution of acetic acid with a solvent for the acetic acid comprising an organic base, said solvent being substantially insoluble in water and said organic base being one which does not form a stable compound by chemical reaction with acetic acid.

5. Process for the concentration of acetic acid which comprises extracting a dilute aqueous solution of acetic acid with a solvent for the acetic acid comprising an aromatic amine, said solvent being substantially insoluble in water and said aromatic amine being one which does not form a stable compound by chemical reaction with acetic acid.

6. Process for the concentration of acetic acid which comprises extracting an aqueous solution of acetic acid with a solvent for the acetic acid comprising an organic base and a neutral organic liquid which is a solvent for the organic base and acetic acid, but is substantially insoluble in water, said organic base being one which does not form a stable compound by chemical reaction with acetic acid.

7. Process for the concentration of acetic acid which comprises extracting a dilute aqueous solution of acetic acid by means of quinaldine.

In testimony whereof we have hereunto set our hands.

GEORG SCHWAEBEL.
FRANZ SCHLEICHER.